United States Patent [19]

Rodriguez

[11] Patent Number: 5,543,446
[45] Date of Patent: Aug. 6, 1996

[54] WATER-SOLUBLE ACRYLAMIDE/ACRYLIC ACID POLYMERS AND THEIR USE AS DRY STRENGTH ADDITIVES FOR PAPER

[75] Inventor: William Rodriguez, Newark, Del.

[73] Assignee: Hercules Incorporated, Wilmington, Del.

[21] Appl. No.: 344,831

[22] Filed: Nov. 23, 1994

[51] Int. Cl.⁶ .................................................. C08L 3/04
[52] U.S. Cl. .................. 524/52; 162/164.7; 162/168.7; 524/217; 524/253; 524/547; 524/560; 526/306; 526/307.7
[58] Field of Search ............... 524/52, 217, 253, 524/547, 560; 526/306, 307.7; 162/164.7, 168.7

[56] References Cited

U.S. PATENT DOCUMENTS

| | | | |
|---|---|---|---|
| 2,661,309 | 12/1953 | Azorlosa | 117/62 |
| 3,061,595 | 10/1962 | Dorion et al. | 260/80.5 |
| 3,247,171 | 4/1966 | Walker et al. | 260/80.3 |
| 4,059,552 | 11/1977 | Zweigle et al. | 260/29.6 |
| 4,525,527 | 6/1985 | Takeda et al. | 524/831 |
| 4,612,250 | 9/1986 | Takeda et al. | 428/500 |
| 4,618,631 | 10/1986 | Takeda et al. | 521/109.1 |

FOREIGN PATENT DOCUMENTS

| | | |
|---|---|---|
| 477265 | 9/1951 | Canada . |
| 547577 | 10/1957 | Canada . |
| 63-050597 | 3/1988 | Japan . |
| 2008207 | 1/1990 | Japan . |
| 2139494 | 5/1990 | Japan . |
| 3279491 | 12/1991 | Japan . |
| 4185796 | 7/1992 | Japan . |
| 5163697 | 6/1993 | Japan . |

*Primary Examiner*—Bernard Lipman
*Attorney, Agent, or Firm*—Mark D. Kuller; Joanne W. Patterson

[57] ABSTRACT

A water-soluble terpolymer for use as a dry strength additive for paper consists essentially of the following units: (a) (meth)acrylamide, (b) an ethylenically unsaturated, aliphatic carboxylic acid or a salt thereof, and (c) a water-soluble, polyvinyl monomer, wherein (c) comprises <0.07 mole % based on total monomers; a 1% solution of the terpolymer is capable of passing through a 200 mesh screen substantially without retention of polymer solids, and the terpolymer has a reduced specific viscosity of about 3.0 deciliters/g or less. The process for preparing the polymer includes the step of continuously adding both components of a redox initiator at a controlled rate to provide better control of polymerization and heat evolution.

56 Claims, No Drawings

5,543,446

WATER-SOLUBLE ACRYLAMIDE/ACRYLIC ACID POLYMERS AND THEIR USE AS DRY STRENGTH ADDITIVES FOR PAPER

FIELD OF THE INVENTION

This invention relates to the preparation of paper products having improved dry strength using an acrylamide/acrylic acid copolymer.

BACKGROUND OF THE INVENTION

It is well known in the art that the strength of paper products can be increased by incorporating increased amounts of paper pulp into the product. However, this also increases the weight of the product at a financial cost. A preferred means of increasing the strength of the paper product is the addition of small amounts of additives that do not substantially increase the weight or cost of the paper.

It is also known in the art that addition of acrylamide/ acrylic acid/methylene-bis-acrylamide terpolymers can improve the surface strength of paper, but this may lead to the loss of internal strength. Such terpolymers are described in published Japanese patent application 32-79491, where 0.1 to 10 parts by weight of a crosslinking agent having at least two double bonds is used. Water-swellable, crosslinked terpolymers of acrylamide, an alkali metal acrylate and a difunctional chemical crosslinker are also known, for example, as described in U.S. Pat. Nos. 3,247,171 and 4,525,527. These products are used, for example, as thickeners and sludge coagulants, and in sanitary goods.

There is still a need for an effective internal dry strength additive for paper that is water-soluble for convenience of operation and readily dilutable with water and that is easily miscible with the papermaking fibers.

SUMMARY OF THE INVENTION

The water-soluble terpolymer of this invention for increasing the internal dry strength of paper products consists essentially of the following units: (a) (meth)acrylamide, (b) an ethylenically unsaturated, aliphatic carboxylic acid or a salt thereof, and (c) a water-soluble, polyvinyl monomer, wherein (c) comprises <0.07 mole % based on total monomers; a 1% solution of the terpolymer is capable of passing through a 200 mesh screen substantially without retention of polymer solids, and the terpolymer has a reduced specific viscosity of 3.0 deciliters/g or less.

Also according to the invention, the water-soluble terpolymer can be prepared by a process comprising (1) providing an aqueous solution of a monomer mixture consisting essentially of (a), (b) and (c) as described above in an amount such that (c) comprises <0.07 mole % based on total monomers, (2) adjusting the pH of the solution to about 3.5 to about 5.0, (3) adjusting the $Cu^{+2}$ concentration to about 10 to about 65 ppm, based on the total amount of (meth)acrylamide, (4) purging with nitrogen to remove oxygen, (5) continuously adding both components of a redox initiator in an amount and at a rate sufficient to obtain the desired terpolymer molecular weight as defined by reduced specific viscosity, and (6) recovering a terpolymer, a 1.0% solution of which is capable of passing through a 200 mesh screen substantially without retention of polymer solids, and which has a reduced specific viscosity of about 3.0 deciliters/g or less.

This invention is also directed to a process for improving the dry strength of paper by adding the terpolymer described above to an aqueous dispersion of papermaking fibers.

The dry strength agents of this invention are water-soluble and are effective under both acid and alkaline conditions.

DETAILED DESCRIPTION OF THE INVENTION

The water-soluble terpolymer of this invention consists essentially of the following units: (a) (meth)acrylamide, (b) an ethylenically unsaturated, aliphatic carboxylic acid or a salt thereof, and (c) a water-soluble, polyvinyl monomer.

Monomer (a) used to make the water-soluble terpolymer of this invention is (meth)acrylamide, i.e., either acrylamide or methacrylamide can be used.

Monomer (b) is an ethylenically unsaturated, aliphatic carboxylic acid or a salt thereof. Preferably the acid is a 1 to 5 carbon mono- or dicarboxylic acid. Suitable acids include, for example, acrylic acid, methacrylic acid, maleic acid, and itaconic acid. Acrylic acid is most preferred.

Monomer (c) is a water-soluble monomer containing at least two vinyl groups, preferably an ethylenically unsaturated carboxylic acid amide of a polyamine, or a glycol ester of an ethylenically unsaturated carboxylic acid. Suitable water-soluble vinyl monomers include, for example, N,N'-methylene-bis-acrylamide, N,N'-methylene-bis-methacrylamide, other lower alkylidene-bis-acrylamides where the alkylidene group has up to four carbon atoms, ethylene glycol diacrylate, ethylene glycol dimethacrylate, and propylene glycol dimethacrylate. N,N'-methylene-bis-acrylamide is most preferred. The amount of component (c) is <0.07 mole %, preferably 0.01 to 0.06 mole %, and most preferably 0.02 to 0.04 mole % based on total monomers.

The molar ratio of (meth)acrylamide to unsaturated carboxylic acid ranges from about 96/4 to about 88/12. Higher amounts of polyvinyl monomer can lead to partial or complete water insolubility of the terpolymers.

The terpolymers are prepared by measuring the concentration of $Cu^{+2}$ ions that are typically present in the (meth)acrylamide monomer, dissolving the monomers in water, adjusting the pH to about 3.5 to about 5.0 with caustic, adjusting the concentration of $Cu^{+2}$ ions to about 10 to about 65 ppm, based on the total amount of (meth)acrylamide, purging with nitrogen to remove oxygen, and adding a two component redox free radical initiator to convert the monomers to polymer. The monomer concentration in water generally ranges from about 15 to about 25 weight percent.

$Copper^{+2}$ ions are used to slightly inhibit the reactivity of the monomer and to control the polymer molecular weight. About 10 to about 65, preferably about 20 to about 45, and most preferably about 30 parts cupric ion per million parts (meth)acrylamide monomer should be present. If there is not a sufficient amount of $Cu^{+2}$ ion present in the (meth)acrylamide monomer, more is added to adjust the concentration to the desired level. The amount of $Cu^{+2}$ ion required depends on the pH of the monomer solution, e.g., more is needed at a lower pH. In order to keep the molecular weight of the terpolymer at the desired level, other variables such as the rate of addition of the redox initiators or the total monomer concentration must be adjusted when the copper$^{+2}$ ion concentration is changed. These adjustments can readily be accomplished by a person skilled in the art of polymer synthesis. Copper$^{+2}$ ion is generally added as copper sulfate, but copper chloride or copper nitrate can also be used.

The two component redox initiator consists of an oxidizing component and a reducing component that form free radicals on reaction with each other. Suitable oxidizing components include, for example, potassium bromate, potassium persulfate, and tert-butyl hydroperoxide. Suitable reducing components include, for example, sodium metabisulfite, ammonium persulfate, and sodium bisulfite. The pair typically used in this invention is potassium bromate/sodium metabisulfite. Other suitable pairs include, for example, potassium persulfate/sodium bisulfite, potassium bromate/sodium bisulfite, and tert-butyl hydroperoxide/sodium bisulfite.

A unique feature of the process for preparing the terpolymers of this invention is that the aqueous solutions of the redox initiator components are added continuously at a controlled rate to the purged monomer solution rather than all at once. Continuous addition provides better control of polymerization and heat evolution. The initiators can be added at the same rate throughout the reaction, or they can be added at one rate for a period of time and then at a different rate for another period of time. Typically for a RSV of 1, the amount of potassium bromate added is about 1% and the amount of sodium metabisulfite added is about 1.5%, based on the weight of total monomers. They are continuously added during polymerization, typically over a period of about 40 to about 120 minutes. Optionally, at the conclusion of the polymerization process, additional sodium metabisulfite can be added to eliminate any residual monomer. This addition is referred to as "polishing" in Table 1.

The Brookfield viscosity of the polymer solution formed in this way depends upon the rate of addition of the redox initiator and the amount of initiator used. Under the typical conditions described in the previous paragraph, the polymer solution has a Brookfield viscosity of about 2,000 to about 20,000 cp at a polymer concentration of about 20 weight percent. Dilution of the solution with water to 1% polymer produces a uniform solution that is free of visible insoluble gels and readily passes through a 200 mesh screen with less than 1% by weight polymer solids retained on the screen. The polymer is further characterized by having a reduced specific viscosity of about 3.0 dl/g or less, preferably about 0.5 to about 3.0 dl/g, at 0.05% concentration in a 2 molal sodium chloride solution.

The process of this invention for improving the internal dry strength of paper comprises contacting an aqueous dispersion of papermaking fibers with the terpolymer described above. Improvements have been demonstrated under both acid and alkaline conditions. A wet layer is then formed from the dispersion of fibers, and the resulting layer is dried, preferably at an elevated temperature. Strength can be further enhanced when a cationic additive, preferably alum or another cationic polymer such as cationic starch or a cationic polyamine wet strength resin, is present.

In the following examples a closed two liter insulated resin kettle having a bottom valve with a stopcock was used. Fittings include a mechanical stirrer (paddle), thermocouple, nitrogen sparge inlet, and a nitrogen outlet passing through an aqueous sodium metabisulfite trap. Initiator solutions were continuously injected into the reactor through hypodermic tubing using a syringe pump. Care is taken to insure that the two streams are separated when injected into the reactor.

Polymer reduced specific viscosity was measured by diluting an aqueous solution of the reaction product with distilled water, and then with aqueous sodium chloride solution at 30° C. to provide a 0.05% polymer solution in 2m sodium chloride solution. The RSV is calculated using the following formula where 147.1 is the kinetic correction factor for the particular Ubbelohde viscometer that was used, $t_s$ is the flow time of the sample, and $t_o$ is the flow time for the 2m sodium chloride solution.

$$RSV = \frac{\left(t_s - \frac{147.1}{t_s}\right)}{\left(t_o - \frac{147.1}{t_o}\right)} - 1$$

EXAMPLES 1–14

Examples 1–14 describe the preparation of the terpolymers of this invention using varying amounts of the polyvinyl monomer. In Example 6, itaconic acid was used as the unsaturated carboxylic acid rather than acrylic acid, and in Example 14, ethylene glycol dimethacrylate was used as the polyvinyl monomer instead of methylene-bis-acrylamide.

In Example 1, deionized water (256.30 g), 8.23 g of 99.7% acrylic acid, 4.00 g of a 1% aqueous solution of methylene-bis-acrylamide, and 178.85 g of aqueous acrylamide (50% solids) were combined in a beaker. The molar ratio of acrylamide/acrylic acid/methylene-bis-acrylamide was 92/8/0.0183. Aqueous sodium hydroxide solution (7.44 g of a 25% solution) was used to adjust the pH to 4.5. The solution was transferred to the reactor and sparged with nitrogen at 6 standard cubic feet per minute (SCFM) while stirring for 30 minutes. The nitrogen sparge rate was decreased to 2 SCFM to maintain a blanket on the reactants. Twenty milliliters each of 5 wt. % aqueous potassium bromate and 5 wt. % aqueous sodium metabisulfite were added to the reactor over 20 minutes at an addition rate of 60 ml per hour. The initial temperature was 22.5° C. and the maximum temperature reached after 9 minutes was 67.9° C. At the conclusion of the reaction, a 5 ml portion of 5% sodium metabisulfite was added to the reaction mixture to react out any residual monomers. The reaction mixture was stirred for ten minutes, and the thick reaction product was drained from the reactor and analyzed. The RSV was 1.3 dl/g and the Brookfield viscosity was 28,300 cp.

The polymers of Examples 2–14 were prepared in the manner described in Example 1. The details of the polymer preparation and properties are given in Table 1.

TABLE 1

| | | | | | | | Sodium | | | |
|---|---|---|---|---|---|---|---|---|---|---|
| | | | | Amount of Copper Based on Acrylamide ppm | Monomer Concentration in Formulation Wt. % | Potassium Bromate Wt. % Based on Total Monomers | Sodium Metabisulfite Wt. % Based on Total Monomers | Initiator Addition Time Minutes | Sodium Multabisulfite Polishing Wt. % Based on Total Monomers | Brookfield Viscosity (cp) | Reduced Specific Viscosity (dl/g) |
| Example | Mole % Acrylamide | Mole % Acrylic Acid | Mole % MBA | | | | | | | | |
| 1 | 92 | 8 | 0.0183 | | 20.2 | 0.99 | 0.99 | 20 | 0.25 | 28300 | 1.3 |
| 2 | 92 | 8 | 0.0091 | | 15.1 | 1.32 | 1.32 | 20 | 0.33 | 928 | 1.0 |
| 3 | 92 | 8 | 0.0183 | 63 | 20.2 | 0.99 | 0.99 | 20 | 0.25 | 1446 | 0.78 |
| 4 | 92 | 8 | 0.0183 | 32 | 20.2 | 0.99 | 0.99 | 20 | 0.25 | 5570 | 1.1 |
| 5 | 92 | 8 | 0.0366 | 42 | 20.2 | 0.49 | 0.49 | 40 | 0.24 | 15260 | 1.4 |
| 6 | 93.9 | |6.1*| | 0.0186 | 21 | 20.8 | 1.90 | 1.90 | 40 | 0.48 | 6100 | 1.1 |
| 7 | 92 | 9 | 0.0361 | 30 | 20.5 | 0.98 | 1.56 | 40 | 0 | 10200 | 1.15 |
| 8 | 92 | 8 | 0.0721 | 30 | 20.5 | 0.98 | 1.56 | 40 | 0 | >2.10$^6$ | 1.4 some insolubles |
| 9 | 92 | 8 | 0.108 | 30 | 20.5 | 0.98 | 1.56 | 40 | 0 | >2.10$^6$ | 0.4 many insolubles |
| 10 | 92 | 8 | 0.009 | 30 | 20.5 | 0.98 | 1.56 | 40 | 0 | 4400 | 0.99 |
| 11 | 92 | 8 | 0.018 | 30 | 20.5 | 0.98 | 1.95 | 40 | 0 | 5000 | 1.10 |
| 12 | 92 | 8 | 0.036 | 30 | 20.5 | 0.98 | 1.95 | 40 | 0 | 9200 | 1.09 |
| 13 | 92 | 8 | 0.054 | 30 | 20.5 | 0.98 | 1.95 | 40 | 0 | 8600 | 1.33 |
| 14 | 92 | 8 | [0.036**] | 30 | 20.5 | 0.98 | 1.95 | 40 | 0 | 5250 | 0.99 |

*Itaconic acid
**Ethylene glycol dimethacrylate

The polymers prepared in Examples 10–13 were used in paper handsheets for testing the effectiveness of the polymers as internal dry strength additives. The handsheets were made from 50% hardwood and 50% softwood pulp at pH 7.0, and had a nominal basis weight of 80 lb/ream. All paper included 0.4% Kymene® 557 polyamidoamine wet strength resin and 0.225% Aquapel® 649 alkylketene dimer sizing agent in addition to 0.1 to 0.3% of the dry strength additives. All percentages are by weight based on the weight of dry pulp. Kymene® 557 wet strength resin and Aquapel® 649 sizing agent are available from Hercules Incorporated, Wilmington, Del., U.S.A. The paper samples were aged under ambient conditions for one day before testing the tensile strength in the thickness direction (Z-direction tensile (ZDT)). This test is a good indicator of the internal bonding between paper fibers. The ZDT of samples containing dry strength additives plus the wet strength and sizing agents was compared to the controls that contained only the wet strength and sizing agents and no dry strength agent. Comparisons in Table 2 are calculated as percent improvement:

$$\text{Percent Improvement} = \frac{ZDT \text{ with dry strength additive} \times 100}{ZDT \text{ of control}}$$

All handsheets were made from the same paper stock. The test results are given in Table 2.

TABLE 2

Testing Results of Paper Handsheets

| Example | Mole % MBA | Dry Strength Agent Added (Wt. %) | ZDT (psi) | Average Improvement in ZDT (%) |
|---|---|---|---|---|
| Control | | 0 | 68.5 | |
| 10 | 0.009 | 0.1 | 81.4 | 18.9 |
| | 0.009 | 0.2 | 81.2 | 18.6 |

TABLE 2-continued

Testing Results of Paper Handsheets

| Example | Mole % MBA | Dry Strength Agent Added (Wt. %) | ZDT (psi) | Average Improvement in ZDT (%) |
|---|---|---|---|---|
| | 0.009 | 0.3 | 77.3 | 12.9 |
| 11 | 0.018 | 0.1 | 75.5 | 10.3 |
| | 0.018 | 0.2 | 80.0 | 16.9 |
| | 0.018 | 0.3 | 78.4 | 14.5 |
| 12 | 0.036 | 0.1 | 75.1 | 9.7 |
| | 0.036 | 0.2 | 75.6 | 10.4 |
| | 0.036 | 0.3 | 78.3 | 14.4 |
| 13 | 0.054 | 0.1 | 76.4 | 11.6 |
| | 0.054 | 0.2 | 73.5 | 7.4 |
| | 0.054 | 0.3 | 85.0 | 24.2 |

It is not intended that the examples given here should be construed to limit the invention, but rather they are submitted to illustrate some of the specific embodiments of the invention. Various modifications and variations of the present invention can be made without departing from the scope of the appended claims.

I claim:

1. A water-soluble terpolymer which is the product of the polymerization reaction of monomers consisting essentially of: (a) acrylamide or methacrylamide, (b) an ethylenically unsaturated, aliphatic carboxylic acid or a salt thereof, and (c) a water-soluble polyvinyl monomer, wherein (c) comprises less than 0.07 mole % based on total monomers; wherein a 1% solution of the terpolymer is capable of passing through a 200 mesh screen substantially without retention of polymer solids, and the terpolymer has a reduced specific viscosity of about 3.0 deciliters/g or less.

2. The terpolymer of claim 1, wherein (b) is a 1 to 5 carbon mono- or dicarboxylic acid.

3. The terpolymer of claim 2, wherein (b) is selected from the group consisting of acrylic acid, methacrylic acid, maleic acid, itaconic acid, and salts thereof.

4. The terpolymer of claim 3, wherein (b) is acrylic acid or a salt thereof.

5. The terpolymer of claim 1, wherein less than 1% by weight of polymer solids are retained on the screen.

6. The terpolymer of claim 1, wherein the amount of (c) is 0.01 to 0.06 mole % based on total monomers.

7. The terpolymer of claim 6, wherein the amount of (c) is 0.02 to 0.04 mole % based on total monomers.

8. The terpolymer of claim 1, wherein (c) is an ethylenically unsaturated carboxylic acid amide of a polyamine, or a glycol ester of an ethylenically unsaturated carboxylic acid.

9. The terpolymer of claim 8, wherein (c) is selected from the group consisting of N,N'-methylene-bis-acrylamide, N,N'-methylene-bis-methacrylamide, ethylene glycol dimethacrylate, and ethylene glycol diacrylate.

10. The terpolymer of claim 9, wherein (c) is N,N'-methylene-bis-acrylamide.

11. The terpolymer of claim 1, wherein (a) is acrylamide, (b) is acrylic acid or a salt thereof, and (c) is N,N'-methylene-bis-acrylamide.

12. The terpolymer of claim 1, wherein the molar ratio of (a) to (b) is about 96/4 to about 88/12.

13. The terpolymer of claim 1, wherein (a) is acrylamide or methacrylamide, (b) is a 1 to 5 carbon mono- or dicarboxylic acid or a salt thereof; (c) is an ethylenically unsaturated carboxylic acid amide of a polyamine, or a glycol ester of an ethylenically unsaturated acid; the amount of (c) is 0.01 to 0.06, based on total monomers, and the molar ratio of (a) to (b) is about 96/4 to about 88/12.

14. The terpolymer of claim 1, wherein (a) is acrylamide or methacrylamide; (b) is selected from the group consisting of methacrylic acid, acrylic acid, maleic acid, itaconic acid, and salts thereof; (c) is selected from the group consisting of N,N'-methylene-bis-acrylamide, N,N'-methylene-bis-methacrylamide, ethylene glycol diacrylate and ethylene glycol dimethacrylate; the amount of (c) is 0.02 to 0.04 mole % based on total monomers, and the molar ratio of (a) to (b) is about 96/4 to about 88/12.

15. A process for preparing the terpolymer of claim 1, said process comprising
  (1) providing an aqueous solution of a monomer mixture consisting essentially of (a) acrylamide or methacrylamide, (b) an ethylenically unsaturated, aliphatic carboxylic acid or a salt thereof, and (c) a water-soluble, polyvinyl monomer, wherein (c) comprises less than 0.07 mole % based on total monomers,
  (2) adjusting the pH of the solution to about 3.5 to about 5.0,
  (3) adjusting the $Cu^{+2}$ ion concentration to about 10 to about 65 ppm based on the amount of acrylamide or methacrylamide,
  (4) purging with nitrogen to remove oxygen,
  (5) continuously adding both components of a redox initiator in an amount and at a rate sufficient to obtain the desired terpolymer molecular weight as defined by reduced specific viscosity, and
  (6) recovering a terpolymer, a 1% solution of which is capable of passing through a 200 mesh screen substantially without retention of polymer solids, and which has a reduced specific viscosity of about 3.0 deciliters/g or less.

16. A process for improving the internal dry strength of paper comprising treating an aqueous suspension of papermaking fibers with the water-soluble terpolymer of claim 1.

17. The process of claim 16, wherein (b) is a 1–5 carbon mono- or dicarboxylic acid.

18. The process of claim 17, wherein (b) is selected from the group consisting of acrylic acid, methacrylic acid, maleic acid, itaconic acid, and salts thereof.

19. The process of claim 18, wherein (b) is acrylic acid or a salt thereof.

20. The process of claim 16, wherein less than 1% by weight of polymer solids are retained on the screen.

21. The process of claim 16, wherein the amount of (c) is 0.01–0.06 mole % based on total monomers.

22. The process of claim 21, wherein the amount of (c) is 0.02–0.04 mole % based on total monomers.

23. The process of claim 16, wherein (c) is an ethylenically unsaturated carboxylic acid amide of a polyamine, or a glycol ester of an ethylenically unsaturated carboxylic acid.

24. The process of claim 23, wherein (c) is selected from the group consisting of N,N'-methylene-bis-acrylamide, N,N'-methylene-bis-methacrylamide, ethylene glycol dimethacrylate, and ethylene glycol diacrylate.

25. The process of claim 24, wherein (c) is N,N'-methylene-bis-acrylamide.

26. The process of claim 16, wherein (a) is acrylamide, (b) is acrylic acid or a salt thereof, and (c) is N,N'-methylene-bis-acrylamide.

27. The process of claim 16, wherein the molar ratio of (a) to (b) is about 96/4 to 88/12.

28. The process of claim 16, wherein (a) is acrylamide or methacrylamide; (b) is a 1–5 carbon mono- or dicarboxylic acid or a salt thereof; (c) is an ethylenically unsaturated carboxylic acid amide of a polyamine, or a glycol ester of an ethylenically unsaturated acid; the amount of (c) is 0.01–0.06 mole % based on total monomers; and the molar ratio of (a) to (b) is about 96/4 to about 88/12.

29. The process of claim 16, wherein (a) is acrylamide or methacrylamide; (b) is selected from the group consisting of methacrylic acid, acrylic acid, maleic acid, itaconic acid, and salts thereof; (c) is selected from the group consisting of N,N'-methylene-bis-acrylamide, N,N'-methylene-bis-methacrylamide, ethylene glycol diacrylate, and ethylene glycol dimethacrylate; the amount of (c) is 0.02–0.04 mole %, based on total monomers, and the molar ratio of (a) to (b) is about 96/4 to about 88/12.

30. A composition comprising the terpolymer of claim 1 and a cationic additive.

31. A composition as claimed in claim 30, wherein the cationic additive is selected from the group consisting of alum, cationic starch or a cationic polyamine wet strength resin.

32. A composition as claimed in claim 31, wherein the polyamine wet strength resin is a polyamidoamine wet strength resin.

33. An aqueous solution comprising the terpolymer claimed in claim 1.

34. The aqueous solution as claimed in claim 33, further comprising a cationic additive.

35. The aqueous solution as claimed in claim 34, wherein the cationic additive is selected from the group consisting of alum, cationic starch or a cationic polyamine wet strength resin.

36. The process of claim 16, further comprising adding a cationic additive.

37. The process of claim 36, wherein the cationic additive is selected from the group consisting of alum, cationic starch or cationic polyamine wet strength resin.

38. The process of claim 15, wherein (b) is a 1 to 5 carbon mono- or dicarboxylic acid.

39. The process of claim 38, wherein (b) is selected from the group consisting of acrylic acid, methacrylic acid, maleic acid, itaconic acid, and salts thereof.

40. The process of claim 39, wherein (b) is acrylic acid or a salt thereof.

41. The process of claim 15, wherein less than 1% by weight of polymer solids are retained on the screen.

42. The process of claim 15, wherein the amount of (c) is 0.01 to 0.06 mole % based on total monomers.

43. The process of claim 15, wherein the amount of (c) is 0.02 to 0.04 mole % based on total monomers.

44. The process of claim 15, wherein (c) is an ethylenically unsaturated carboxylic acid amide of a polyamine, or a glycol ester of an ethylenically unsaturated carboxylic acid.

45. The process of claim 15, wherein (c) is selected from the group consisting of (a) N,N'-methylene-bis-acrylamide, N,N'-methylene-bis-methacrylamide, ethylene glycol dimethacrylate, and ethylene glycol diacrylate.

46. The process of claim 45, wherein (c) is N,N'-methylene-bis-acrylamide.

47. The process of claim 15, wherein (a) is acrylamide, (b) is acrylic acid or a salt thereof, and (c) is N,N'-methylene-bis-acrylamide.

48. The process of claim 15, wherein the molar ratio of (a) to (b) is about 96/4 to about 88/12.

49. The process of claim 15, wherein (a) is acrylamide or methacrylamide; (b) is a 1 to 5 carbon mono- or dicarboxylic acid or a salt thereof; and (c) is an ethylenically unsaturated carboxylic acid amide of a polyamine, or a glycol ester of an ethylenically unsaturated acid; the amount of (c) is 0.01 to 0.06 mole % based on total monomers, and the molar ratio of (a) to (b) is about 96/4 to about 88/12.

50. The process of claim 15, wherein (a) is acrylamide or methacrylamide; (b) is selected from the group consisting of methacrylic acid, acrylic acid, maleic acid, itaconic acid, and salts thereof; (c) is selected from the group consisting of N,N'-methylene-bis-acrylamide, N,N'-methylene-bis-methacrylamide, ethylene glycol diacrylate and ethylene glycol dimethacrylate; the mount of (c) is 0.02–0.04 mole % based on total monomers, and the molar ratio of (a) to (b) is about 96/4 to about 88/12.

51. The process of claim 15, wherein the $Cu^{+2}$ concentration is about 20 to about 45 ppm, based on the amount of acrylamide or methacrylamide.

52. The process of claim 51, wherein the $Cu^{+2}$ concentration is about 30 ppm, based on the amount of acrylamide or methacrylamide.

53. The process of claim 15, wherein the oxidizing component of the redox initiator is selected from the group consisting of potassium bromate, potassium persulfate, and tert-butyl peroxide.

54. The process of claim 15, wherein the reducing component of the redox initiator is selected from the group consisting of sodium metabisulfite, ammonium persulfate, and sodium bisulfite.

55. The process of claim 15, wherein the redox initiators are selected from the group consisting of potassium bromate/sodium metabisulfite, potassium persulfate/sodium bisulfite, potassium bromate/sodium bisulfite, and tert-butyl hydroperoxide/sodium bisulfite.

56. The process of claim 15, wherein the redox initiators are potassium bromate/sodium metabisulfite.

* * * * *

UNITED STATES PATENT AND TRADEMARK OFFICE
CERTIFICATE OF CORRECTION

PATENT NO. : 5,543,446
DATED : August 6, 1996
INVENTOR(S) : William Rodriguez

It is certified that error appears in the above-indentified patent and that said Letters Patent is hereby corrected as shown below:

Col. 10, line 7 "mount" should be replaced by --amount--.

Signed and Sealed this

Twenty-sixth Day of November 1996

Attest:

BRUCE LEHMAN

*Attesting Officer*  *Commissioner of Patents and Trademarks*